(12) United States Patent
Burlett (10) Patent No.: US 7,824,284 B2
(45) Date of Patent: Nov. 2, 2010

(54) POWER TRANSMISSION BELT AND CORD ADHESIVE SYSTEM AND ADHESION METHOD

(75) Inventor: Donald J. Burlett, Oxford, MI (US)

(73) Assignee: The Gates Corporation, Denver, CO (US)

(*) Notice: Subject to any disclaimer, the term of this patent is extended or adjusted under 35 U.S.C. 154(b) by 39 days.

(21) Appl. No.: 11/947,470

(22) Filed: Nov. 29, 2007

(65) Prior Publication Data

US 2009/0142572 A1    Jun. 4, 2009

(51) Int. Cl.
*B32B 25/02* (2006.01)
*B29D 29/00* (2006.01)

(52) U.S. Cl. .................... 474/8; 474/237; 474/263; 474/264; 474/266; 57/237; 428/167; 428/295.1; 428/373; 428/375

(58) Field of Classification Search .............. 474/8; 57/237
See application file for complete search history.

(56) References Cited

U.S. PATENT DOCUMENTS

| | | | |
|---|---|---|---|
| 4,234,714 A | 11/1980 | Earing et al. | |
| 4,535,121 A | 8/1985 | Ozelli et al. | |
| 4,669,517 A | 6/1987 | Krishnan | |
| 4,774,142 A | 9/1988 | Schmidt et al. | |
| 5,183,877 A | 2/1993 | Swanson | |
| 5,246,735 A | 9/1993 | Takata et al. | |
| 5,401,565 A | 3/1995 | Vouette | |
| 5,530,085 A | 6/1996 | Giorgini | |
| 5,759,695 A | 6/1998 | Primeaux, II | |
| 5,860,883 A * | 1/1999 | Jonen et al. ............ | 474/205 |
| 6,262,217 B1 | 7/2001 | Tallmadge et al. | |
| 6,491,598 B1 * | 12/2002 | Rosenboom .............. | 474/260 |
| 6,512,039 B1 | 1/2003 | Mowrey | |
| 6,607,828 B1 | 8/2003 | Hasaka | |

(Continued)

FOREIGN PATENT DOCUMENTS

JP    03-185139 A    8/1991

(Continued)

OTHER PUBLICATIONS

Rubber World, "Application of diene-based thermoplastic polyurethane in rubber compounding"; Steven K. Henning and Herbert Chao, Sartomer Company, Inc.; pp. 25-30 Oct. 2006.

(Continued)

*Primary Examiner*—Robert A Siconolfi
*Assistant Examiner*—San Aung
(74) *Attorney, Agent, or Firm*—P. N. Dunlap, Esq.; J. A. Thurnau, Esq.

(57) ABSTRACT

A power transmission belt incorporating an adhesive treatment system and method for bonding fiber to rubber which includes an optional primer coat based on a low-molecular-weight isocyanate, followed by an overcoat including: (a) a prepolymer based on an isocyanate-terminated diene oligomer, and optionally (b) a low-molecular-weight isocyanate, and/or (c) a thermoplastic urethane comprising the reaction product of the same prepolymer with MDI and EHD. A polyester, aramid, or carbon fiber tensile cord for rubber reinforcement may be treated with the primer coat and the overcoat. A power transmission belt or other dynamic rubber product having ethylene-alpha-olefin elastomer as the primary rubber constituent may be reinforced by the tensile cord.

19 Claims, 2 Drawing Sheets

U.S. PATENT DOCUMENTS

| | | | |
|---|---|---|---|
| 6,660,376 B1 | 12/2003 | Zimmel et al. | |
| 6,860,962 B2 | 3/2005 | Pelton | |
| 6,864,321 B2 | 3/2005 | Chao et al. | |
| 2002/0042317 A1* | 4/2002 | South | 474/264 |
| 2004/0063854 A1* | 4/2004 | Lin et al. | 524/606 |
| 2006/0213174 A1* | 9/2006 | Wu | 57/237 |

FOREIGN PATENT DOCUMENTS

| | | | |
|---|---|---|---|
| JP | 10-002379 A | | 1/1998 |
| JP | 2004-149727 A | | 5/2004 |
| JP | 2004149727 | * | 5/2005 |
| JP | 2007-154382 A | | 6/2007 |

OTHER PUBLICATIONS

Sartomer Company, Inc.; "Application of Diene-Based Thermoplastic Urethanes in Rubber Compounding"; Steven K. Henning and Herbert Chao; pp. 2-16; Nov. 1-3, 2005; ISSN: 1547-1977.

Sartomer Company, Inc.; "Polurethane Concepts", vol. II, pp. 1-4; Sep. 2005.

* cited by examiner

POWER TRANSMISSION BELT AND CORD ADHESIVE SYSTEM AND ADHESION METHOD

BACKGROUND OF THE INVENTION

1. Field of the Invention

This invention relates generally to a power transmission belt, more particularly to an adhesive system for tensile cord in a belt, and specifically to the use of isocyanate-terminated diene polymer to bond cord to elastomeric belt material.

2. Description of the Prior Art

V-belts and multi-V-ribbed belts in particular are conventionally employed for the transmission of peripheral forces in drive systems. Conventional belts have a flexible, generally elastomeric main belt body portion defining an undercord- or compression section, an overcord- or tension section and a tensile- or load-carrying section disposed between the undercord and overcord sections. The load-carrying section in turn generally includes a longitudinally extending highly resilient tensile member typically formed of one or more tensile cords. The generation of adhesion between the tensile cords and rubber compounds in dynamic products such as belts, tires, couplings, or hose is fundamental to their proper operation. Without significant adhesion, the product will fail to perform under dynamic conditions. An adhesive system may include many components or layers beginning with a fiber sizing applied to the fibers as they are spun, a primer typically applied to a yarn or greige cord or fabric or other fibrous reinforcement, an adhesive applied to and/or within the cord, and an overcoat applied to the treated cord bundle (or other fibrous reinforcement) to ensure compatibility with the surrounding rubber compound. The treated cord may finally be embedded in or surrounded by an adhesive- or gum-rubber composition generally formed from one or more rubber plies or layers making up the body of the belt or other dynamic rubber product.

A conventional treatment for polyester cord consists of three coatings: 1) a primer treatment of isocyanate or epoxy in organic solvent; 2) a resorcinol-formaldehyde-latex ("RFL") treatment; and 3) a conventional overcoat adhesive based on a complex blend of chlorinated polymers, curatives, crosslinkers, adhesion promoters, film-formers, and/or acid scavengers, and the like such as one of the Chemlok® adhesives produced under that trademark by Lord Corporation and exemplified by U.S. Pat. No. 6,512,039. This is a complex series of treatments that are expensive, involve some environmentally unfriendly components, and require optimization for best performance. Examples of such three-step adhesive treatments are disclosed in U.S. Pat. Nos. 6,607,828 and 5,610,217. A variation used for aramid cord, disclosed in U.S. Pat. No. 5,246,735, includes a first polyurethane treatment based on hydroxyl- or epoxy-terminated liquid rubber and isocyanate-terminated liquid rubber either of which may be a diene rubber, followed by a conventional RFL treatment. Presumably, an overcoat adhesive would also be needed for many applications, such as for bonding to ethylene-alpha-olefin rubber compounds.

Steven K. Henning and Herbert Chao, *Rubber World*, Vol. 234, No. 7, p. 25 (October 2006), disclose the use of a thermoplastic polyurethane ("TPU") resin, sold under the trade name Poly bd 2035 TPU by Sartomer Company, Inc., based on a polybutadiene-diol prepolymer, a diisocyanate, and a cross-linker or chain extender, as a co-curable adhesive tie layer between rubber compounds and a polyurethane component. Likewise, U.S. Pat. No. 4,774,142 discloses a coupling agent layer for bonding diene rubber to polyurethane plastic in tires, with the coupling agent formed of a polyenol polyurethane which is a reaction product of polybutadiene-diol, a diisocyanate, and a cross-linker or chain extender.

U.S. Pat. No. 6,660,376 discloses a hot-melt polyurethane adhesive for fabric bonding based on a prepolymer that is the reaction product of a polyol, a polyisocyanate, and a high-molecular-weight thermoplastic polyurethane lacking hard segments. The polyol may be a polybutadiene-diol, polyester, or polyether diol. U.S. Pat. No. 5,401,565 discloses for heat-bonding textiles a heat-adhesive layer comprising a hydroxylated polybutadiene resin, a free isocyanate, and a blocked isocyanate.

U.S. Pat. No. 4,535,121 discloses a polyurethane/epoxy adhesive system for flocking elastomers such as ethylene-propylene-diene elastomer ("EPDM"), the adhesive including an isocyanate-terminated prepolymer, which may be polybutadiene-based, and a reaction product of an aromatic diisocyanate with a polyfunctional epoxide.

Polyurea adhesives and coatings are known. Representative examples are provided by U.S. Pat. Nos. 5,183,877, and 5,759,695. The polyureas disclosed in the art are typically based on diamine- and/or diisocyanate-terminated polyethylene or propylene glycol and may include other hydrogen-containing material and/or amine-terminated chain extender including polyether or polyester polyol.

SUMMARY

The present invention is directed to adhesive systems and methods which provide bonding of textile reinforcement cords to rubber in engineered elastomeric products such as belts, hose, or tires. The adhesive system provided has fewer process steps or coating layers than the conventional three layer treatment described above. The adhesive system may also provide for flexibility of the cord and a good balance of physical properties, environmental resistance, and low cost. The adhesive system is predominantly polyurea and/or polyisocyanurate reaction products of isocyanate-terminated diene polymer and avoids use of halogenated polymers.

The present invention is directed to an adhesive treatment for a tensile member for a power transmission belt having as the primary reactive ingredient an isocyanate-terminated diene oligomer or polymer. The adhesive treatment may include a moisture-reactive low-molecular-weight isocyanate. The diene polymer may be isocyanate-terminated polybutadiene of molecular weight from about 2000 to about 15,000. The isocyanate may be diphenylmethane diisocyanate or a derivative thereof.

The present invention is also directed to an adhesive treatment having a primer coat and an overcoat, wherein the primer coat consists essentially of low-molecular-weight isocyanate, and the overcoat includes isocyanate-terminated diene oligomer or polymer. The overcoat may include low-molecular-weight isocyanate. The two coatings may be applied to a substrate such as a textile, by means of solvent solutions or dispersions of the aforementioned ingredients.

The present invention is also directed to a power transmission belt having an elastomeric body, a pulley-engaging surface, and a tensile member embedded within the elastomeric body. The tensile member includes fiber and an adhesive treatment at least partially coating the fiber and contacting the elastomeric body. The adhesive treatment includes as the primary reactive ingredient an isocyanate-terminated diene oligomer or polymer. The adhesive treatment is a predominantly polyurea/polyisocyanurate reaction product of the isocyanate-terminated diene oligomer or polymer and any other reactive ingredients present. The adhesive treatment need not require any RFL layer.

The adhesive treatment in the belt tensile member may further be a reaction product of a low-molecular-weight isocyanate. The adhesive treatment may further include a thermoplastic polyurethane resin, which may be a reaction product of isocyanate-terminated diene oligomer or polymer, a low-molecular-weight isocyanate, and a polyol chain extender.

The present invention is also directed to a belt with a tensile member having an adhesive treatment that consists essentially of a primer layer and an overcoat layer with the primer layer including the reaction product of a low-molecular-weight isocyanate and the overcoat layer including the reaction product of the isocyanate-terminated diene oligomer or polymer, and both layers including predominantly polyurea and/or polyisocyanurate reaction product.

The overcoat layer may include a thermoplastic polyurethane resin, which may be a reaction product of isocyanate-terminated diene oligomer or polymer, a low-molecular-weight polyisocyanate, and a polyol chain extender. The overcoat layer may also be a reaction product of low-molecular-weight isocyanate.

The fibers of the tensile member may include polyester, polyamide, aramid, carbon fiber, polyketone, PBO, PEN, or the like. The elastomer belt body may be based on peroxide-cured ethylene-alpha-olefin elastomer, nitrile elastomer, chloroprene elastomer, diene elastomer, or polyurethane.

The invention is also directed to a power transmission belt which may be in the form of a toothed belt, a multi-v-ribbed belt, or a v-belt.

The present invention is also directed to a method of bonding textile to elastomer including the steps:
a) mixing an adhesive cement having an isocyanate-terminated diene oligomer or polymer of molecular weight in the range from 2000 to 15000 and a solvent;
b) applying the adhesive to a textile to form a adhesive-cement-treated textile;
c) drying the adhesive-cement-treated textile to form a treated textile, so that the isocyanate-terminated diene reacts with available moisture and/or heat such that any reaction yields predominantly polyurea and/or polyisocyanurate reaction products;
d) bringing an elastomer composition in contact with the treated textile; and
e) curing the elastomer composition to effect a adhesive bond between the adhesive and the elastomer composition.

The adhesive may further include a low-molecular weight isocyanate. A primer cement having a low-molecular weight isocyanate may be applied and dried before application of the adhesive. The diene oligomer or polymer may be polybutadiene.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

The inventive fiber adhesive treatment system may have a single adhesive coating or may have two coatings: a primer coat and an overcoat.

The inventive fiber-to-elastomer adhesive treatment system is based on isocyanate-terminated diene elastomer as the primary, or even only, adhesive component. The treatment system may consist of a single layer of adhesive applied to the fiber for example via an organic-solvent-based cement. Alternatively, the treatment system may also include a primer layer applied to the fiber before the aforementioned adhesive layer. Herein, when a two layer treatment system is thus used, the first layer is called the "primer" and the second and final layer is called the "overcoat." In a one layer treatment system, the layer may sometimes be called the overcoat and sometimes called the "adhesive," depending on the context. The term "cement" implies a fluid mixture containing the chemical components of the adhesive treatment. A cement-treated textile is generally wet with cement and requires drying to remove the solvent. After drying a cement to remove the solvent or carrier, what remains on the treated textile is called the primer, the overcoat, or the adhesive layer or coat, as the case may be.

The primer coat, if used, is based on a low-molecular-weight reactive isocyanate compound. The primer is applied to a tensile cord by means of a primer cement which may be a solution of diisocyanate in a suitable solvent such as toluene. Aromatic or aliphatic diisocyanates may be used. Exemplary diisocyanates for use in preparing the primer solution include diphenylmethane diisocyanate ("MDI"), modified or polymeric MDI, toluene diisocyanate ("TDI"), paraphenylene diisocyanate ("PPDI"), and the like. For example, Mondur® MR 5 is a suitable polymeric MDI sold under that trademark by Bayer MaterialScience LLC. Mixtures of diisocyanates may be used, including mixed isomers or forms of MDI. Herein and in the claims, "MDI" or "diphenylmethane diisocyanate" is understood to include any of the various forms or derivatives. The term "low-molecular-weight isocyanate" is understood to include diisocyanates, tri-isocyanates, poly-isocyanates, or other suitable reactive isocyanate forms which are not based on polymeric chains, generally having a molecular weight less than about 500.

The overcoat is based on, as the primary adhesive and reactive ingredient, an isocyanate-terminated unsaturated diene oligomer or polymer, which may be a reaction product of a hydroxyl-terminated diene-diol oligomer or resin with a diisocyanate compound. The isocyanate-terminated diene may be considered a prepolymer in that it is reactive and/or useful for forming a network or larger polymer or copolymer chain, including use in making a thermoplastic urethane ("TPU"). By oligomer is meant a relatively low molecular weight polymer. Exemplary diene-diol oligomers are polybutadiene-diol and polyisoprene-diol. The diene-diol oligomer may advantageously be linear and fairly uniform in chain length. Aromatic or aliphatic diisocyanates may be used in preparing the prepolymer. Exemplary diisocyanates for use in preparing the prepolymer include MDI as defined above, TDI, PPDI, and the like. Mixtures of diisocyanates may be used, including mixed isomers or forms of MDI. A suitable prepolymer, for example, is Krasol® NN-22 sold under that trademark by Sartomer Company, Inc. Krasol NN-22 is an isocyanate-terminated prepolymer prepared from hydroxyl-terminated polybutadiene (Krasol LBH3000) resin and a modified MDI. A proprietary dilithio initiator is used in the anionic polymerization of the Krasol polybutadiene diols. The microstructure of the Krasol diene-diol is about 65% vinyl. The molecular weight of the Krasol diol ranges from about 2000 g/mol to about 5000 g/mol. Krasol NN-22 is a liquid with a viscosity of 17 Pa·s at room temperature. Isocyanate-terminated polybutadiene of molecular weight in the range from about 2000 to about 15000, and/or of viscosity in the range from about 5 to about 500 Pa·s may be used as the primary adhesive and reactive ingredient.

The overcoat may be a mixture of thermoplastic polyurethane ("TPU") and the aforementioned isocyanate-terminated diene polymer. The overcoat may optionally include anti-oxidant, catalyst, or other ingredient for processing, shelf life, stability, or other considerations. The overcoat may be applied to the primed tensile cord by means of a solution or cement, using a suitable solvent such as toluene. At least one of the TPU and the prepolymer are based on an unsaturated diene polymer chain, such as polybutadiene or polyisoprene. In a preferred embodiment, both TPU and prepolymer are based on an unsaturated diene polymer chain, such as polybutadiene or polyisoprene. The unsaturated polymer chain is believed to provide crosslink sites for bonding to various elastomers or elastomer compositions used in the belt body, whether sulfur cured or peroxide cured. The isocyanate-terminal groups on the prepolymer are believed to provide reactive sites for bonding to the primer or to the fiber and for forming a network within the overcoat layer.

A TPU used in the overcoat may be a reaction product of an isocyanate-terminated prepolymer, a diisocyanate, and a chain-extending diol. The isocyanate-terminated prepolymer for use in preparing the TPU is a reaction product of a hydroxyl-terminated diene-diol oligomer with a diisocyanate. Exemplary diene-diol oligomers for the prepolymer are polybutadiene-diol and polyisoprene-diol. The microstructure of the diene-diol may be about 65% vinyl. The molecular weight of the diene-diol may range from about 500 g/mol to about 10,000 g/mol. The prepolymers may be suitably linear and fairly uniform in chain length. Exemplary diisocyanates for use in preparing the TPU and/or the isocyanate-terminated prepolymer include MDI, TDI, PPDI, and the like. Chain-extending diols for use in preparing the TPU may have a molecular weight up to about 600. Exemplary chain-extending diols include 2-ethyl-1,3-hexanediol ("EHD"), N,N-diisopropanol aniline ("DIPA"), and 2,2,4-trimethylpentane-1, 3-diol ("TMPD"). A suitable TPU for use in the overcoat is Poly bd® 2035 TPU, sold under that trademark by Sartomer Company, Inc. Poly bd 2035 TPU is a resinous TPU material with 80 Shore A hardness, softening point of about 90° C., and has been recommended for use as a co-curable adhesive tie layer between a rubber compound and a polyurethane component. In the present invention, the primary function of the TPU is believed to be as a viscosity modifier for the cement or a modulus modifier for the treatment.

By blending in a solvent solution a liquid prepolymer, such as Krasol NN-22, with a resinous solid TPU, such as Poly bd 2035, physical characteristics of the resulting overcoat can be adjusted. For example, the overcoat may range from a tacky, soft, or fluid material to a stiff, non-tacky resin. For use in building power transmission belting, a degree of tack is often desirable, but the treated tensile cord should be able to release from itself when taken off a spool of treated cord. It has been found that a range of overcoat compositions may be useful for adhesive treatment of tensile cords for belts, including those overcoat compositions with a ratio of prepolymer to TPU of from about 1:2 to about 2:1, or from about 1:4 to about 4:1, or from about 1:9 to about 9:1. Since it is believed that a relatively high ratio of isocyanate-terminated prepolymer to TPU is advantageous for bonding to the primer and/or the fiber material, other means besides choice of that ratio may be advantageously used to adjust the physical properties of the overcoat and/or the treated cord. One such means is suitable choice of molecular weight of the diene diol used for forming the isocyanate-terminated prepolymer. For example, at a given ratio of prepolymer to TPU in the overcoat, a higher molecular weight prepolymer should have a higher viscosity, and therefore, may be advantageous for providing an adhesive-treated cord with less tackiness or higher modulus. Likewise, adjusting the relative amounts of low molecular weight diol, diisocyanate and prepolymer in the TPU formulation can be used to adjust the relative amount of soft and hard segment in the TPU, and therefore the hardness, among other properties, can be adjusted. Likewise, the choice of molecular weight, isocyanate end-group, and the like may affect the viscosity or other pertinent property of the overcoat adhesive and thus the viscosity or modulus of the overcoat. Thus, useful diene-diols for either the overcoat adhesive and/or the TPU prepolymer may have a molecular weight ranging from about 500 to about 20,000 or from about 2000 to about 15,000.

As the overcoat properties are varied, the properties of the treated cord may also vary. A higher viscosity or higher modulus overcoat will generally result in a stiffer cord and less tack in handling. The cord stiffness is also affected by the degree of penetration of overcoat and primer into the bundle of fibers. The degree of penetration of primer and overcoat into the fiber bundle of the cord is also a function of the cement or solution viscosity and the relative compatibility of the cement components with the fiber surface. Thus, it should be appreciated that the invention may be practiced on a variety of fiber types by suitably selecting from a wide range of possible isocyanates, prepolymers, and TPUs, and by suitably choosing the treatment solution parameters of solvent, solids content, solids pick-up, and ratio of ingredients. Cord treating parameters, such as drying temperature, dipping rate, use of wipers, and the like, may also be selected to affect various end properties. The examples presented below illustrate some suitable combinations of parameters.

It is believed that the isocyanate-terminated polybutadiene reacts in the presence of ubiquitous moisture and/or in the presence of heat in the same way as low molecular weight diisocyanate compounds such as MDI. The primary reactions occurring in the inventive overcoat and the optional primer are thus believed to involve urea formation and isocyanurate formation. Urea formation involves the reaction of isocyanate with moisture to form an unstable carbamic acid, which gives off carbon dioxide to form a reactive amine. The amine quickly reacts with another isocyanate to form a urea linkage. A urea is also capable of reacting with a third isocyanate, forming a biuret, and leading to branching. Isocyanates can also react with themselves without moisture involvement, generally at higher temperatures, in a trimerization reaction to form the tri-isocyanurate ring structure or "polyisocyanurates." Thus, the predominant reaction product of the inventive adhesive system is believed to be a polyurea and/or polyisocyanurate network with a large number of polybutadiene functional groups available on the surface for subsequent reaction with an elastomer body in which the treated cord may be embedded.

The general term "polyurethane" may be commonly used in the art to include polyureas, polyisocyanurates, and other polymers which may have little or no actual urethane groups. Herein, "polyurethane" is used in a more literal sense to refer to polymers which are reaction products of isocyanates and alcohols and thus contain significant amounts of urethane groups, —NH—CO—O—. Herein and in the claims, "polyurea" is used to refer to polymers which are reaction products of isocyanates with themselves in the presence of moisture or water, or reactions of isocyanates with amines which may be reaction intermediates, resulting in significant amounts of urea groups, —NH—CO—NH—. Included in the term "polyurea" are biurets, which are formed when a urea group reacts with additional isocyanate to form a branched polymer. "Polyisocyanurate" is used to refer to polymers which are reaction products of isocyanates with themselves at elevated temperatures to form a tri-isocyanurate ring structure. The terms, polyurea and polyisocyanurate, are not meant to imply total purity of reaction, but are used to indicate what is believed to be the dominant reaction mechanism and/or reaction product involved in the inventive adhesive system. Thus, minor amounts of other reaction products or other reaction mechanisms may be involved without further mention in what may still be referred to herein as a predominantly polyurea/polyisocyanurate reaction product. Nevertheless, it is believed that no significant amount of urethane linkage is formed in the reaction product of the inventive adhesive system.

It is thought that the adhesive system is effective because of 1) the affinity of isocyanate groups for various difficult-to-bond fibers, and the polyurea/polyisocyanurate network-forming ability of isocyanates; 2) the compatibility, or co-curing capability, of unsaturation in polybutadiene with EPDM by means of either sulfur or free-radical curatives; and 3) the strategic placement of the respective functional groups in sufficient concentration in the proximity of the intended interfaces by suitable choice of component ratios and effective coating process conditions. It is also believed to be advantageous for the modulus of the overcoat to be intermediate to the modulus of the fiber and that of the surrounding rubber of the belt. The invention is not intended to be limited by the preceding theory of operation.

While the embodiments of articles comprising the tensile cord of the present invention shown in the drawings are belts and belt drives, it is anticipated that the tensile cords of the present invention will be useful in tires, air springs, flexible couplings, and other composite rubber articles subject to dynamic loads as well as textile-reinforced rubber articles in general. Usage of tensile cord in air springs is described for example in U.S. Pat. No. 4,954,194, and the contents of that publication with respect to same are incorporated herein by reference. Usage of tensile cord in flexible couplings is described for example in U.S. Pat. No. 6,283,868, and the contents of that publication with respect to same are incorporated herein by reference. Usage of cord for carcass and/or tread reinforcement in tires is described for example in U.S. Pat. No. 3,616,832, and the contents of that publication with respect to same are incorporated herein by reference.

Various tensile cord materials may be advantageously bonded or treated with the inventive adhesive treatment. Fibers useful for rubber reinforcement but generally recognized as difficult-to-bond which may be used in the present invention include polyester fibers, poly-p-phenylene-benzobisoxazole ("PBO"), aramid, and carbon fibers. Polyester fibers include polyethylene terephthalate ("PET"), polyethylene naphthalate ("PEN"), and the like. Aramid (aromatic polyamide) fibers include meta-aramid, para-aramid, and aramid copolymers and the like. Other fibers which may be advantageously used in belts of the present invention include rayon, vinylon, polyamide, polyketone, and the like. Polyamides include nylon 6, nylon 66, nylon 46, and the like. Polyketones include polyetherketones (PEK), polyetheretherketones (PEEK), and polyaryletherketones (PAEK), and polymers in which ethylene is copolymerized with carbon monoxide and poly (1-oxotrimethylene) and the like.

Figure 1:
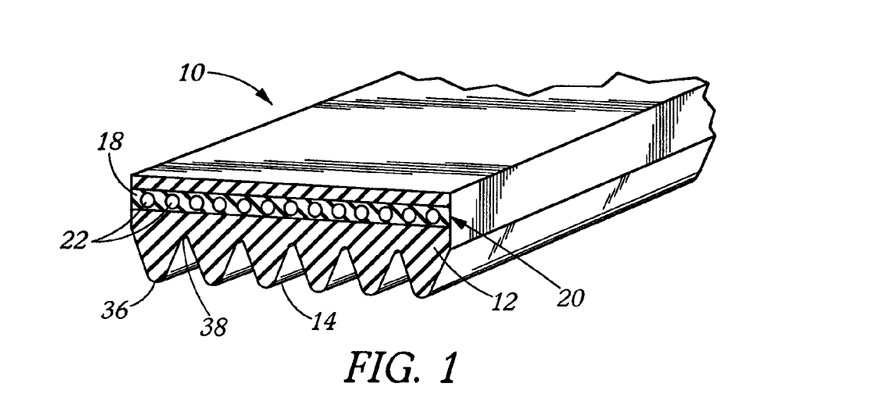
FIG. 1 is a partially fragmented perspective view of a portion of a multi-V-ribbed belt constructed in accordance with an embodiment of the present invention.
Figure 2:
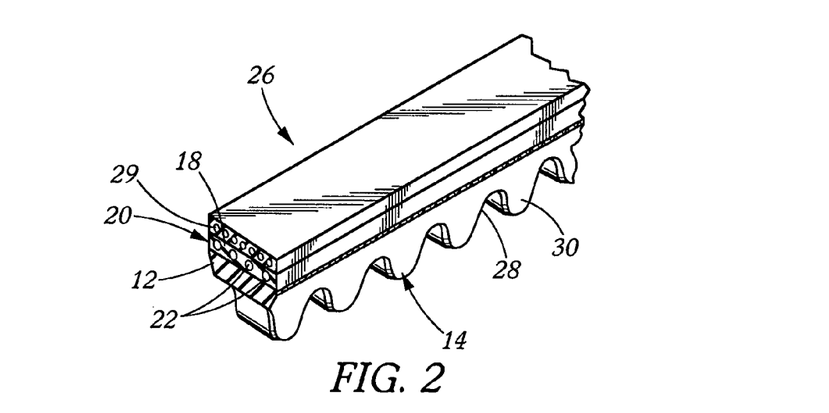
FIG. 2 is a partially fragmented perspective view of a portion of a V-belt constructed in accordance with another embodiment of the present invention.
Figure 3:
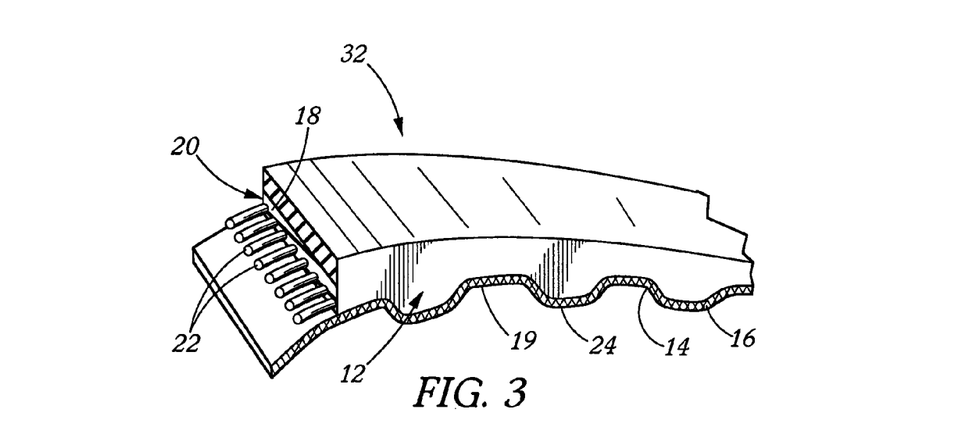
FIG. 3 is a partially fragmented perspective view of a portion of a synchronous belt constructed in accordance with another embodiment of the present invention.

Referring to FIG. 1, multi-V-ribbed belt 10 in accordance with an embodiment of the present invention is shown generally. Multi-V-ribbed belt 10 includes elastomeric main belt body portion 12, or undercord, and sheave contact portion 14 positioned along the inner periphery of main belt body portion 12. The word, "sheave" as used in this context includes conventional pulleys and sprockets used with a power transmission belt, and also rollers and like mechanisms. The particular sheave contact portion 14 of the belt of FIG. 1 is in the form of a plurality of ribs having raised areas or apexes 36 alternating with a plurality of trough areas 38 defining there between oppositely facing sides. In each of the instances of FIGS. 1-2, sheave contact portion 14 is integral with main belt body portion 12 and may be formed from the same elastomeric material(s) as described below. In FIG. 3 however, sheave contact portion 14 can be seen to include reinforcing fabric 24, explained in further detail below, as conventionally utilized in synchronous belt building configurations, and is thus formed of a material other than that of main belt body portion 12 in that embodiment of the present invention.

Tensile or load-carrying cord section 20 is positioned above undercord 12 for providing support and strength to belt 10. In the illustrated form the tensile section comprises at least one longitudinally extending tensile cord 22, aligned along the length of the belt, and prepared according to the present invention as has been described in detail above. In accordance with various embodiments of the present invention, the tensile cord may be at least partially in contact with or embedded in adhesive rubber member 18. The skilled practitioner would readily appreciate that in the several FIGS. 1-3, adhesive rubber member 18 is illustrated in exaggerated form in order to visually distinguish it from the other elastomeric portions of the belt. In actuality, the cured composite is frequently visually indistinguishable from the surrounding elastomeric belt body portion except in cases, e.g., where one and not the other of adhesive rubber member 18 and undercord 12 is fiber loaded. The adhesive rubber member 18 may actually be of the same material as elastomeric main belt body 12.

A reinforcing fabric (not shown in FIG. 1) may optionally be utilized and in the case of V-belts and multi-V-ribbed belts intimately fits along the surface of the belt opposite sheave contact portion 14 to form a face cover or overcord for the belt. The fabric may be of any desired configuration such as a conventional weave consisting of warp and weft threads at any desired angle, or may consist of warp threads held together by spaced pick cords as exemplified by tire cord fabric, or of a knitted or braided configuration, or of a non-woven configuration, or paper, or plastic film, and the like. The fabric may be friction- or skim-coated with the same or different elastomer composition as that of elastomeric main belt body 12. More than one ply of fabric may be employed. If desired, the fabric may be cut or otherwise formed to be arranged on a bias so that the strands form an angle with the direction of travel of the belt. One embodiment of such reinforcing fabric use is shown in FIG. 2 wherein a rubber-skim coated tire cord fabric 29, is illustrated in exaggerated form. Usage of nonwoven or paper materials is described for example in U.S. Pat. No. 6,793,599 to Patterson et al., and the contents of that patent with respect to same are incorporated herein by reference. Usage of plastic film is described for example in U.S. Pat. No. 7,235,028, and the contents of that publication with respect to same are incorporated herein by reference.

Referring to FIG. 2, a standard notched V-belt 26 is illustrated. The V-belt 26 includes main elastomeric belt body portion 12 similar to that illustrated in FIG. 1, and tensile or load-carrying section 20 in the form of one or more tensile cords 22 embedded in an optional adhesive rubber member 18, also similar to that illustrated in FIG. 1. The main elastomeric belt body portion 12, adhesive rubber member 18, and load-carrying section 20 of V-belt 26 may be constructed from the same materials as described above for FIG. 1.

The V-belt 26 also includes sheave contact portion 14 as in multi-V-ribbed belt 10 of FIG. 1. The side surfaces of elastomeric main belt body portion 12, or in the case of a V-belt as illustrated, of the compression section, serve as the driving surfaces of belt 26. In the embodiment illustrated, sheave contact portion 14 is in the form of alternating notch depression surfaces or troughs 28 and toothed projections 30. These alternating depression surfaces 28 and projections 30 may preferably follow a generally sinusoidal path as illustrated which serves to distribute and minimize bending stresses as sheave contact portion 14 passes around pulleys during operation.

While in the illustrated embodiment, V-belt 26 is in the form of a raw-edged belt, reinforcing fabric 29 as described above may moreover be employed, either as a face cover or overcord for the belt as shown, or fully encompassing the belt to form a banded V-belt.

Referring to FIG. 3, toothed belt 32 is illustrated. The toothed belt 32 includes main elastomeric belt body portion 12 and sheave contact portion 14 as in the case of the belts of FIGS. 1 and 2, and also includes load-carrying section 20 as previously described for the belts of FIGS. 1 and 2. For synchronous belt 32 however, sheave contact portion 14 is in the form of alternating teeth 16 and land portions 19. Reinforcing fabric 24 as furthermore described above for the belts of FIGS. 1 and 2 may also be utilized and in this case intimately fits along alternating teeth 16 and land portions 19 of belt 32 to form a face cover therefor.

In each of the cases of FIGS. 1-3 shown above, main belt body portion 12 may be formed of any conventional and/or suitable cured elastomer composition, and may be of the same as or different from that described below in relation to the optional adhesive rubber member 18. Suitable elastomers that may be utilized for this purpose include for example polyurethane elastomers (including as well polyurethane/urea elastomers) (PU), polychloroprene rubber (CR), acrylonitrile butadiene rubber (NBR), hydrogenated NBR(HNBR), styrene-butadiene rubber (SBR), alkylated chlorosulfonated polyethylene (ACSM), epichlorohydrin, polybutadiene rubber (BR), natural rubber (NR), and ethylene alpha olefin elastomers such as ethylene propylene copolymers (EPM), ethylene propylene diene terpolymers (EPDM), ethylene octene copolymers (EOM), ethylene butene copolymers (EBM), ethylene octene terpolymers (EODM); and ethylene butene terpolymers (EBDM); ethylene vinylacetate elastomers (EVM); ethylene methylacrylate (EAM); and silicone rubber, or a combination of any two or more of the foregoing.

To form elastomeric belt body portion 12 in accordance with an embodiment of the present invention, the elastomer(s) may be blended with conventional rubber compounding ingredients including fillers, plasticizers, stabilizers, vulcanization agents/curatives, and accelerators, in amounts conventionally employed. For example, for use with ethylene-alpha-olefin elastomer and diene elastomers such as HNBR, one or more metal salts of alpha-beta organic acids may be employed in amounts now conventionally utilized to improve dynamic performance of the resultant article. Thus zinc dimethacrylate and/or zinc diacrylate may be utilized in such compositions in amounts of from about 1 to about 50 weight parts per hundred parts of elastomer resin ("phr"); or alternatively of from about 5 to about 30 phr; or of from about 10 to about 25 phr. These materials furthermore may contribute to the adhesiveness of the composition, and increase the overall cross-link density of the polymer upon curing with peroxide or related agents through ionic crosslinking, as is now well known in the art.

One skilled in the relevant art would readily appreciate any number of suitable compositions for utilization in or as the elastomeric portions of the belt. A number of suitable elastomer compositions are described for example in The R. T. Vanderbilt Rubber Handbook (13th ed., 1996), and with respect to EPM or EPDM compositions and such compositions having particular high tensile modulus properties, are furthermore set forth in U.S. Pat. Nos. 5,610,217, and 6,616,558 respectively, the contents of which, with respect to various elastomer compositions that may be suitable for use in the formation of power transmission belt body portions, are specifically incorporated herein by reference. In addition, with respect to several cast PU compositions that may also be utilized in the practice of various embodiments of the present invention, such compositions are described for example in WO 09692584 to Wu et al., and the contents of that international patent application with respect to same are incorporated herein by reference.

In an embodiment of the present invention associated with automotive accessory drive applications, the elastomeric belt body portions 12 may be formed of a suitable ethylene alpha olefin composition, such as an EPM, EPDM, EBM or EOM composition, which may be the same or different composition as that employed as the adhesive rubber member composition.

The elastomeric main belt body portion 12 may moreover be loaded with discontinuous fibers as is well known in the art, utilizing materials such as including but not limited to cotton, polyester, fiberglass, aramid, acrylic, and nylon, in such forms as staple- or chopped fibers, flock or pulp, in amounts generally employed. In a preferred embodiment relating to profiled (e.g., as by cutting or grinding) multi-v-ribbed belts, such fiber loading is preferably formed and arranged such that a substantial portion of the fibers are formed and arranged to lay in a direction generally transverse the direction of travel of the belt. In molded multi-v-ribbed belts and/or synchronous belts made according to flow through methods however, the fiber loading would generally lack the same degree of orientation.

The treated tensile member cord may be of any desired construction, meaning the number, yarn count, twist level or direction of the yarn or yarns, ply or plies, making up the cord are not limited. The method of manufacture of the belt is not limited. For example, the inventive belt may be built up on a mandrel in a series of layers and vulcanized using methods known in the art.

The following examples are submitted for the purpose of illustrating the nature of the invention and are not intended as a limitation on the scope thereof.

In the examples, Comparative Examples ("Comp. Ex.") are given letter designations, and inventive Examples ("Ex.") are given numeral designations. All examples used a common tensile cord construction. The tensile cord was of PET fiber, with a plied construction of 1000-2/3 denier. The sample cord was treated on a single-end laboratory treater with three oven zones. A plant trial was also run on a 20-end production treater. The production and laboratory treaters were set up to provide similar thermal history and tension history for the control cord and the example cords. The treatment of the control cord included a primer dip, dried in oven zone one about 25 seconds at 227° C., a VP-SBR RFL dip dried in oven zone two, and a conventional Chemlok 238 overcoat dip dried in oven zone three. The Inventive Examples generally had the same primer and primer drying step, if any. The inventive overcoat was usually applied after oven zone three and air dried, unless otherwise noted. Sometimes the inventive overcoat was applied before the second oven zone and/or zone two was sometimes run at 138° C. as noted. The cord tensions ranged from about 5 kg to about 12 kg to provide proper heat setting and handling of the cord. To avoid bias from run-to-run variation, a control sample (e.g. Comp. Ex. A) and/or a production lot (e.g. Comp. Ex. D) was run and/or tested with every series of Examples. The example belts were all constructed of two tensile cords of the same construction but of opposite twist spiraled side by side onto layers of reinforcing fabric and test rubber (designated "S" and "Z" twist in the tables). The rubber used for the belt body and for adhesion specimens was an EPM formulation similar to Example 7 of U.S. Pat. No. 5,610,217, which is hereby incorporated herein by reference, but with 30 phr of cotton flock.

Several tests were used for physical properties, adhesion, and belt performance. Adhesive solids concentration was based on the stoichiometry or determined by machine that automatically weighed a sample both wet and after drying. Adhesive percent pickup in the cord was determined by weighing a standard length of dry cord before and after treatment. Peel testing for adhesion was performed according to ASTM D413 at a 180° angle with a 25.4-mm wide Type-A strip sample which had been built for that purpose on a lathe using a cylindrical mandrel, then vulcanized and cut into strips. Adhesion was reported as an area average at a peel rate of 50.8 mm per minute. Adhesion failure mode is reported as percent cohesive failure using the notation "cx" for "x" percent cohesive failure, with x being a number from 0 to 100, and with the remainder (100-x percent) being adhesive failure. In cases where the adhesion failure mode is not cohesive or only slightly cohesive, the notation "ax" for adhesive failure with only x percent rubber coverage or cohesive failure is used. Cord stiffness was measured on a Tinius Olsen Stiffness Tester according to the procedure of ASTM D747 but based on the actual peak bending force in units of kilograms force ("kgf") for five parallel cords tested at a 12.7-mm span over a deflection range of from zero to 65°.

Figure 4:
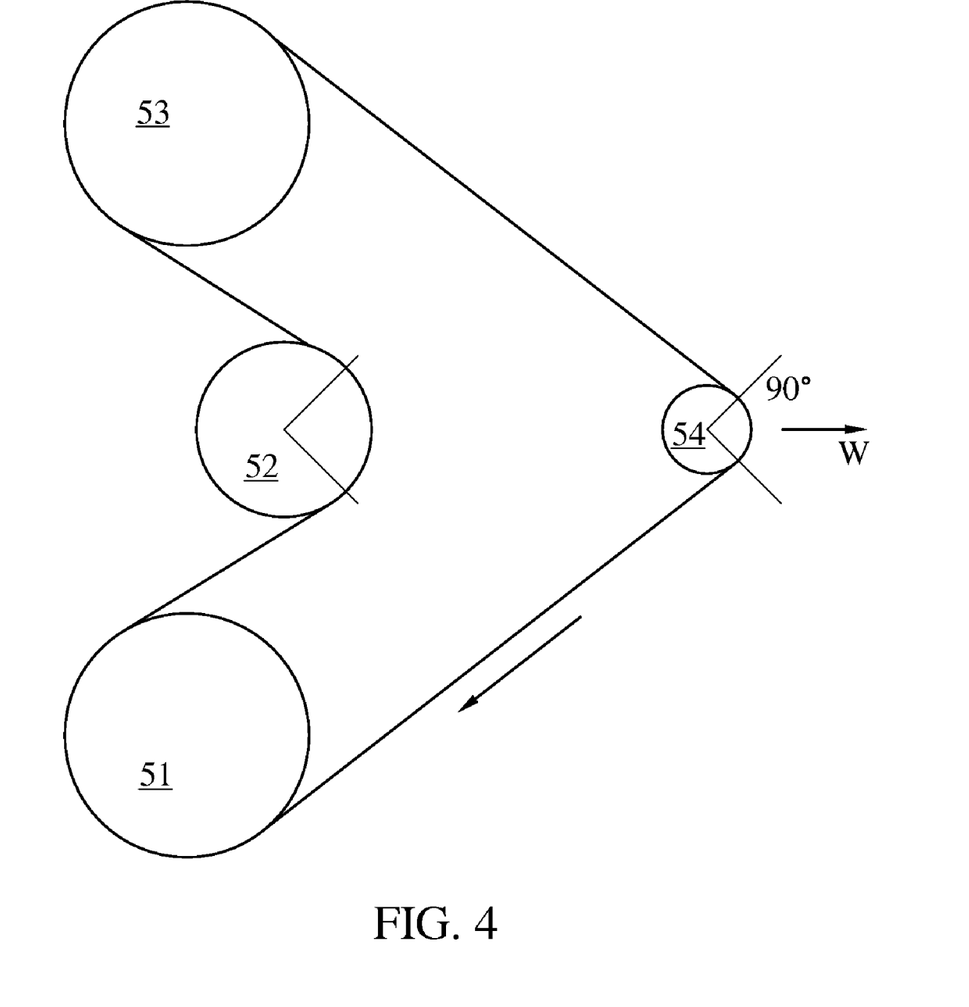
FIG. 4 is a schematic of a high-temperature durability test used to test a characteristic of a belt embodiment of the invention.

Belt testing was carried out on a high-temperature durability test ("HT test") and on a room-temperature, high-speed durability test ("RTHS test"). The HT test was a four-point drive and the layout is depicted in FIG. 4. Referring to FIG. 4, pulleys 51, 53, and 54 have multi-v-rib profiles with six grooves and diameters of 120.65, 120.65, and 44.45 mm, respectively. Pulley 51 is the driver, turning at 4900 rpm clockwise. Pulley 52 is an idler with diameter of 60 mm. Pulley 53 provides a 20.3 Nm driven torque. A tension was applied to the test belt by means of a hanging weight W of 90.7 kg. The belt length was 1270 mm. The ambient temperature was maintained at 121° C. Three-rib belts and six-rib belts were tested. The target life for a conventional commercial 6-rib belt on the HT test was about 100 hours. Adhesive failure was indicated initially by edge cord pulling away from the elastomer belt body, and finally by the complete unraveling of the belt.

The RTHS test was a two-point, dead-weight drive at room temperature. Both pulleys had multi-v-rib profiles with three grooves and diameters of 60 mm. The driver pulley rotated at 4900 rpm, and the driven pulley provided a torsional load of 14.4 Nm. The belt length was 1270 mm. The hub load on the tension generating pulley was maintained at 120 kg. The target life for a conventional 3-rib belt on the RTHS test was about 100 to 160 hours. Adhesive failure was indicated as on the HT test.

On each sample cord having a primer treatment, the isocyanate primer was Mondur® MR 5 polymeric MDI, prepared in a toluene solution at about 15.8 percent solids, generally resulting in a primer percent pick up of about 2%, or from about 1% up to about 3% based on the cord dry weight. All Example overcoat cements were prepared in toluene solutions at the indicated total solids concentration.

Tables 1 and 2 illustrate the use of embodiments of the inventive adhesive system to bond fibers to an elastomer composition, in particular PET fiber to EPM rubber. Tables 3-7 include belt results, thus illustrating belt embodiments of the invention in addition to adhesive examples.

In a first set of experiments, shown in Table 1, it was found that isocyanate-terminated polybutadiene over bare (Ex. 1) or primed (Ex. 3) PET fiber provided good adhesion to peroxide-cured EPM rubber. Likewise, a mixture of isocyanate-terminated polybutadiene and polyurethane over bare (Ex. 2) or primed (Ex. 4) PET fiber provided good adhesion to peroxide-cured EPDM rubber. On the other hand, polyurethane resin based on polybutadiene, (Comp. Ex. B) alone on bare PET fiber did not provide good adhesion to EPDM. The Poly bd 2035 TPU alone does not have the reactivity to generate a polyurea/polyisocyanurate network, and the results in the peel force support this conclusion. In Table 1, a value of peel adhesion at room temperature around 23 kgf (50 lbs.) is considered excellent, and a peel value below 14 kgf (30 lbs.) is considered poor. The cord stiffness results generally depend on the total pickup of treatment on the cord and the nature of the materials. In the case of Comp. Ex. B, the low stiffness may be indicative of too low a total pickup weight. It is difficult to state an absolute minimum level of cord stiffness, however, because of the variability of the process, the dependence of stiffness on the materials selected, and the like. Nevertheless, in many cases it is believed that a cord stiffness of at least 0.091 kgf or at least 0.136 kgf as defined herein is indicative of a better treated cord.

In a second set of experiments, shown in Tables 2a and 2b, various treatment compositions involving isocyanate-terminated polybutadiene and treatment parameters such as oven temperature were explored. Table 2a shows that a range of compositions incorporating isocyanate-terminated polybutadiene as the primary adhesive ingredient with additional low-molecular weight diisocyanate and/or polybutadiene-based polyurethane resin can provide good adhesion to peroxide-cured EPDM rubber. Table 2a shows that generally, a two-coat adhesion system using a low-molecular-weight diisocyanate primer such as MDI improves the adhesion between PET fiber and EPDM rubber over that of a similar one-coat system. Thus, Ex. 6 has better adhesion than Ex. 5, Ex. 8 is better than Ex. 7, and Ex. 16 is better than Ex. 15. However, equally good adhesion results can be obtained with a one-coat adhesive by including the low-molecular-weight diisocyanate in the overcoat cement. This is seen by comparing Ex. 10-13 to Ex. 8. Ex. 17-25 in Table 2b represent three one-coat adhesive embodiments (no primer) applied with three different drying conditions. While room temperature drying seems adequate for the two-coat adhesives of Table 2a, it is apparent that the one-coat adhesives of Table 2b provide better adhesion if dried at an elevated temperature for at least a few seconds. Thus, the present invention can replace a conventional three-coat adhesive system, based on RFL for example, with a single adhesive treatment, thereby reducing process cost and process complexity. In one embodiment, the inventive adhesive treatment may thus be a single treatment with up to 100% by dry weight isocyanate-terminated polybutadiene, and up to about 30% polybutadiene-based polyurethane resin, and/or up to about 30% low-molecular-weight diisocyanate. Drying the single adhesive treatment for 3 to 30 seconds at 100° C. to 290° C. can improve the adhesion compared to room temperature drying.

Tables 2a and 2b also show that a higher solids level and correspondingly higher solids pickup can result in higher adhesion values. Comparing Ex. 5 and Ex. 17, or Ex. 7 and Ex. 18, for example, shows that increasing solids and pickup results in higher peel adhesion between PET fiber and EPDM. It is difficult to state an absolute minimum total solids pickup level for good adhesion since these measurements are so dependent on the process conditions and material characteristics, and on whether one coating or two coatings are used. Nevertheless, it is believed that a solids pickup of at least about 2% is needed for acceptable adhesion performance. For a two-coat adhesive system as described above, a solids pickup of around 2%, or 1% to 3%, for the primer first coat, and a total solids pickup of at least about 3%, or 4%, is generally sufficient for acceptable adhesion performance. It may be noted that good adhesion is observed for embodiments of the invention at significantly lower total solids pickup than typically utilized in conventional cords. Thus, the invention may provide overall savings in material usage.

Table 3 illustrates further some of the adhesive systems of Tables 1 and 2. In addition, Tables 3 and 4 show some results of using the inventive adhesive system in multi-v-ribbed belts. In Table 3, Ex. 26 and 27 are repeats of Ex. 1, 5, and 17. The peel adhesion results are consistent with the previous results. However, the belt results are not as good as one might hope. The first edge cord separation time, in particular, was less than the control belts, Comp. Ex. C and D. It is believed that the air drying of Ex. 26-27 did not introduce sufficient heat to create the polyurea/polyisocyanurate network needed, or did not cause the free isocyanate groups to sufficiently bond to the fiber. At any rate, it is believed that if heat had been applied during drying of the single adhesive overcoat, as was done for Ex. 20 and 23, then the belt performance would have been better. Additional examples shown below support this theory. Nevertheless, it should be understood, as discussed further below, that some embodiments may be suitable primarily for static rubber reinforcement applications or low-stress dynamic applications, while other embodiments may be suitable for more demanding dynamic applications.

Ex. 28-29 show that comparable belt performance to the controls C-D is obtained with a two-layer adhesive system consisting of an MDI primer and a Krasol/TPU overcoat. Ex. 30-31 utilized a roller wiper to reduce the total solids pickup compared to Ex. 28-29. Peel adhesion results for Ex. 30-31 were comparable to Ex. 28-29, showing a broad range of solids pickup may be useful.

Table 4 shows lab and HT belt test data for another laboratory cord treater trial run with selected adhesive systems. Comp. Ex. E-G show the typical results for a conventional 3-layer treatment based on RFL, whether run on lab equipment or production equipment. Ex. 34 and 36 illustrate a single-layer adhesive system and belts according to an embodiment of the invention, i.e., no primer was used. Again, it is seen that applying heat during drying of the adhesive (i.e., 224° C. (435° F.) in the zone-three oven) results in improved original peel adhesion and improvement in the time to first edge cord separation on the HT belt test. Even better results are obtained with a two-layer adhesive system, even with air drying of the overcoat, as illustrated by Ex. 32, 37, and 38. Ex. 33 and 35 had very good peel adhesion results, but only fair HT test results. On the other hand, controls Comp. Ex. F and G had very good HT test results, but only fair to poor peel adhesion results. This seeming lack of consistency is not uncommon in the complex field of adhesive testing and belt dynamic testing, and is indicative of the many treatment and material and test variables involved as well as the difference between static and dynamic tests and applications. Thus, it should be understood that some embodiments of the inventive adhesion system may be suitable for only static rubber reinforcement applications, while other embodiments may be suitable for either static or dynamic applications. It is hypothesized that a low-molecular-weight isocyanate primer generally penetrates better into a bundle of fibers and provides better stabilization of a fiber bundle to dynamic stresses than the inventive overcoat adhesive alone.

Table 5 shows the results of a production scale trial run of the same adhesive system as Ex. 37-38. The adhesive and HT belt test results for Ex. 39-40 were fairly comparable to the control Comp Ex. H, suggesting that an embodiment of the inventive adhesive system is commercially viable for use in multi-v-ribbed belts.

Table 6 shows a range of adhesive overcoat compositions utilizing Krasol isocyanate-terminated polybutadiene as the primary adhesive ingredient and poly bd 2035 TPU as a viscosity adjusting additive. MDI primer was also used in all the examples of Table 6. The intent of the examples was to maintain the solids pickup at a consistent level of about 7%, or 6% to 8%. Thus, a roller wiper was used to remove excess overcoat and/or the solids of the overcoat cement was also adjusted somewhat as needed and as indicated in Table 6. The peel adhesion results were uniformly excellent for all Ex. 41-49 that were tested. The HT belt results for belts utilizing these tensile cords were also generally excellent and comparable to the control Comp. Ex. J. The HT results may indicate a trend toward earlier edge cord separation as the viscosity additive exceeds 50% of the solids content of the overcoat composition. However, the time to reach edge cord failure on the same test seems to be consistently excellent over the entire range of compositions studied. Thus, it is believed that isocyanate-terminated diene polymer is the primary adhesive ingredient in the adhesive system when it makes up from 100% to about 35%, or at least 45% or 50%, of the overcoat adhesive on a dry solids weight percent basis.

TABLE 1

|  | Comp Ex A | Comp Ex B | Ex. 1 | Ex. 2 | Ex. 3 | Ex. 4 |
|---|---|---|---|---|---|---|
| Primer | MDI | none | none | none | MDI | MDI |
| Adhesive | VP-SBR RFL | none | none | none | none | None |
| Overcoat Cement: | Chemlok 238 |  |  |  |  |  |
| Krasol NN-22 (dry wt %) |  | 0 | 100 | 78 | 100 | 78 |
| Poly Bd 2035 TPU |  | 100 | 0 | 22 | 0 | 22 |
| Cement total Solids (%) | — | 4.1 | 18.8 | 11 | 18.8 | 12.5 |
| Total pickup (dry wt %) | 9.6 | 1.2 | 6.8 | 4.2 | 2.9 | 5.5 |
| Cord stiffness (kgf) | 0.22 | 0.08 | 0.21 | 0.20 | 0.28 | 0.28 |
| Peel Adhesion RT (kgf) | 23.0 | 11.1 | 17.9 | 19.3 | 17.6 | 23.9 |
| failure mode | c100 | A0 | c15 | c60 | a5 | c100 |
| Peel Adhesion 100° C. (kgf) | 8.3 | 3.7 | 9.4 | 6.8 | 9.5 | 8.5 |
| failure mode | c100 | A0 | c95 | c50 | c95 | c100 |
| Aged Peel adhesion 7 day/140° C. (kgf) | 19.4 | 12.0 | 16.2 | 16.8 | 18.6 | 20.7 |
| failure mode | c100 | A0 | c10 | c10 | c50 | c100 |

TABLE 2a

|  | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|---|
| Primer | none | MDI | None | MDI | none | none | none | none | none | none | MDI | none |
| Overcoat Cement Composition |  |  |  |  |  |  |  |  |  |  |  |  |
| Krasol NN-22 (wt % dry) | 100 | 100 | 78 | 78 | 75 | 67.5 | 67.5 | 60 | 60 | 90 | 90 | 90 |
| Poly Bd 2035 TPU (wt % dry) | 0 | 0 | 22 | 22 | 0 | 22.5 | 22.5 | 20 | 20 | 10 | 10 | 10 |
| MDI-polymeric (wt % dry) | 0 | 0 | 0 | 0 | 25 | 10 | 10 | 20 | 20 | 0 | 0 | 0 |
| Drying Conditions | RT-air | RT-air | RT-air | RT-air | RT-air | RT-air | RT-air | RT-air | RT-air | RT-air | RT-air | RT-air |
| Cement Solids (wt % dry) | ~12 | 18.2 | ~8 | 11.5 | 18.2 | 11.7 | ~8 | 11.8 | ~8 | 11.7 | 11.7 | ~8 |
| % pickup (total) | 5.7 | 12.5 | 3.7 | 5.3 | 8.8 | 6.4 | 3.8 | 7.2 | 4.4 | 6 | 7.9 | 4.6 |
| Cord Stiffness (kgf) | 0.17 | 0.25 | 0.12 | 0.23 | 0.21 | 0.14 | 0.14 | 0.14 | 0.13 | 0.11 | 0.23 | 0.08 |
| Peel Adhesion - RT (kgf) | 14.3 | 24.4 | 14.7 | 21.7 | 16.3 | 22.8 | 22.1 | 21.5 | 20.9 | 1.8 | 2.2 | 1.3 |
| failure mode | a0 | c100 | a5 | c100 | a0 | c95 | c85 | c80 | c80 | c10 | c100 | a0 |
| Peel Adhesion - 100° C. (kgf) | 7.9 | 9.9 | 5.6 | 8.6 | 9.0 | 8.9 | 8.9 | 8.8 | 8.2 | 0.7 | 0.9 | 0.6 |
| failure mode | c60 | c100 | c25 | c100 | c99 | c99 | c95 | c90 | c90 | c80 | c100 | c30 |
| Peel Adhesion Aged 1 wk/140° C. (kgf) | 17.8 | 20.3 | 17.0 | 18.5 | 15.9 | 19.4 | 19.8 | 18.5 | 17.4 | 1.7 | 2.0 | 1.9 |
| failure mode | c25 | c100 | c20 | c100 | c10 | c75 | c95 | c70 | c50 | c15 | c100 | c50 |

TABLE 2b

|  | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|
| Primer | none | none | none | none | none | none | none | none | none |
| Overcoat Cement Composition |  |  |  |  |  |  |  |  |  |
| Krasol NN-22 (wt % dry) | 100 | 78 | 50 | 100 | 78 | 50 | 100 | 78 | 50 |
| Poly Bd 2035 TPU (wt % dry) | 0 | 22 | 0 | 0 | 22 | 0 | 0 | 22 | 0 |
| MDI - polymeric (wt % dry) | 0 | 0 | 50 | 0 | 0 | 50 | 0 | 0 | 50 |
| Overcoat Drying Conditions | RT-air | RT-air | RT-air | 4 s/104° C. | 4 s/104° C. | 4 s/104° C. | 4 s/224° C. | 4 s/224° C. | 4 s/224° C. |
| Cement Solids (dry wt %) | 18.2 | 11.5 | 18.2 | 18.19 | 11.51 | 18.19 | 18.19 | 11.51 | 18.19 |
| % pickup (total) | 11.3 | 5.1 | 8.6 | 10.3 | 7.9 | 9.7 | 8 | 5.2 | 6.1 |
| Cord Stiffness (kgf) | 0.19 | 0.13 | 0.22 | 0.21 | 0.19 | 0.22 | 0.23 | 0.13 | 0.23 |
| Peel Adhesion - RT (kgf) | 17.0 | 15.8 | 16.6 | 19.1 | 16.6 | 14.3 | 21.6 | 23.2 | 24.0 |
| failure mode | c10 | c5 | a0 | c25 | c10 | a0 | c40 | c65 | c70 |
| Peel Adhesion - 100° C. (kgf) | 8.8 | 6.0 | 8.9 | 9.3 | 6.9 | 7.7 | 8.5 | 8.0 | 9.9 |
| failure mode | c95 | c30 | c90 | c95 | c30 | c80 | c40 | c50 | c99 |
| Peel Adhesion Aged 1 wk/140° C. (kgf) | 18.6 | 18.6 | 18.7 | 20.5 | 15.8 | 16.8 | 21.8 | 21.5 | 21.1 |
| failure mode | c60 | c60 | c20 | c100 | c15 | c20 | c85 | c95 | c100 |

TABLE 3

|  | Ex 26 | Ex 27 | Ex 28 | Ex 29 | Ex 30 | Ex 31 | Comp Ex C | Comp Ex D |
|---|---|---|---|---|---|---|---|---|
| Greige Cord Twist Direction | S | Z | S | Z | S | Z | S | S & Z |
| Primer | None | none | MDI | MDI | MDI | MDI | MDI | MDI |
| Adhesive | None | none | none | none | none | None | VP-SBR RFL | VP-SBR RFL |

TABLE 3-continued

|  | Ex 26 | Ex 27 | Ex 28 | Ex 29 | Ex 30 | Ex 31 | Comp Ex C | Comp Ex D |
|---|---|---|---|---|---|---|---|---|
| Overcoat cement: |  |  |  |  |  |  | Chemlok | Chemlok |
| Krasol NN-22 (% dry) | 100 | 100 | 78 | 78 | 78 | 78 | 238 | 238 |
| Poly bd 2035 TPU | 0 | 0 | 22 | 22 | 22 | 22 |  |  |
| Process Notes | air dried | air dried | air wiper | air wiper | roller wiper | roller wiper | Lab | Plant |
| Cement Solids (%) | 18.8 | 18.8 | 11 | 11 | 11 | 11 | — | — |
| % pickup (total) | 7.6 | 8.7 | 7.2 | 8.1 | 4.4 | 3.2 | 12.1 | — |
| Cord Stiffness (kgf) | 0.19 | 0.20 | 0.29 | n/a | 0.24 | 0.26 |  |  |
| Peel Adhesion - RT (kgf) | 15.1 | 14.7 | 21.8 | 22.4 | 22.5 | 21.8 | 18.8 | — |
| failure mode | a0 | a0 | c90 | c90 | c95 | c100 | c98 |  |
| Peel Adhesion - 100° C. (kgf) | 8.5 | 8.0 | 8.6 | 9.0 | 8.5 | 9.0 | 8.6 |  |
| failure mode | c95 | c85 | c95 | c99 | c100 | c100 | c100 |  |
| Peel Adhesion Aged 1 wk/140° C. (kgf) | 18.7 | 18.5 | 18.7 | 19.5 | 19.3 | 19.1 | 18.8 |  |
| failure mode | c60 | C65 | c100 | c100 | c100 | c100 | c95 | — |
| RTHS Belt test - 3-rib belt |  |  |  |  |  |  |  |  |
| First Edgecord Separation (hrs) | 3, 4, 4 |  | 4, 4, 4 |  | no belts |  | 8, 12, 12 | 4, 4, 12 |
| Undercord Separation Failure* (hrs) | 23 |  | 22 |  | — |  | 60 | 41 |
| HT Belt Test - 3-rib belt |  |  |  |  |  |  |  |  |
| Edgecord Separation Failure (hrs) |  |  | 15.3, 6.5 |  | — |  | 12.5, 13 |  |
| HT Belt Test - 6-rib belt |  |  |  |  |  |  |  |  |
| First Edgecord Separation* (hrs) | 21, 31 |  | (21f) 29, none, 112 |  | — |  | none, 160 | 112, 136 |
| Undercord Cracking Failure* (hrs) | no data |  | 93, 108, 112 |  | — |  | 95, 136 | 136, 85 |
| Belt Temp (° C.) | 141-146 |  | 137-148 |  | — |  | 136-146 | 140-149 |

TABLE 4

|  | Ex. 32 | Ex. 33 | Ex. 34 | Ex. 35 | Ex. 36 | Ex. 37 | Ex. 38 | Comp Ex E | Comp Ex F | Comp Ex G |
|---|---|---|---|---|---|---|---|---|---|---|
| Primer | MDI | MDI | None | MDI | None | MDI | MDI | MDI | MDI | MDI |
| Adhesive | None | None | None | None | None | None | None | VP-SBR RFL | VP-SBR RFL | VP-SBR RFL |
| Overcoat Cement: |  |  |  |  |  |  |  | Chemlok 238 | Chemlok 238 | Chemlok 238 |
| Krasol NN-22 (dry wt %) | 100 | 100 | 67.5 | 67.5 | 67.5 | 67 | 67 |  |  |  |
| Poly Bd 2035 TPU (dry wt %) | 0 | 0 | 22.5 | 22.5 | 22.5 | 33 | 33 |  |  |  |
| Mondur MR5 (dry wt %) | 0 | 0 | 10 | 10 | 10 | 0 | 0 |  |  |  |
| Tension | std | std | std | std | std | std | Low* | std | Std | lo |
| Process notes: | air dried | air dried | air dried | air dried | 224° C. | air dried | air dried | Plant | Lab | Lab |
| Cement Solids (%) | 18 | 18 | 12 | 12 | 12 | 12 | 12.5 | — | — | — |
| % pickup (total) (S/Z) | 11.9/12.8 | 10.9/11.5 | 4.3/5.3 | 6.1/7.0 | 5.4/5.7 | 9.8/11.0 | 10.4/9.9 | — | 11.1/11.4 | 13.6/12.3 |
| Cord Stiffness (kgf) (S/Z) | 0.20/0.21 | 0.20/0.22 | 0.15/0.17 | 0.22/0.24 | 0.10/0.14 | 0.24/0.27 | 0.23/0.24 | — | 0.15/0.13 | 0.15/0.15 |
| Original Peel Adhesion, RT, 20"/min |  |  |  |  |  |  |  |  |  |  |
| Area Avg (kgf) | 24.2 | 23.6 | 8.9 | 22.8 | 19.9 | 14.0 | 22.6 |  | 14.4 | 12.4 |
| failure mode | c97 | c100 | a0 | c100 | c40 | c50 | c97 |  | c10 | c10 |
| Belt Cord Peel Peak Load (N) | 70.2 | 60.8 | 70.8 | 72.1 | 63.8 | 69.1 | 60.6 | 62.8 | 60.4 | 46.6 |
| Cord Peel Average Load (N) | 62 | 56.5 | 60.1 | 66.3 | 58.1 | 59.3 | 54.2 | 56.1 | 53.6 | 41.8 |
| Belt Cord Pullout Peak Load (N) | 433.7 | 383.9 | 402.8 | 425.6 | 445.6 | 435.2 | 428.7 | 494.4 | 399.1 | 367.1 |
| HT Belt Test - 6-rib belt |  |  |  |  |  |  |  |  |  |  |
| First Edgecord Separation (hrs) | 102 | 53 | 80 | 76 | 102 | 150 | 168 | 95 | 136 | 110 |
| Undercord Cracking Failure (hrs) | 75 | 90 | 97 | 80 | 82 | 96 | 126 | 110 | 94 | 107 |
| Belt Temp (° C.) | 142-146 | 141-144 | 140-145 | 134-138 | 139-144 | 136-144 | 136-140 | 136-140 | 140-145 | 136-142 |

*Lower tension used to produce a lower shrinkage variation of the tensile member

TABLE 5

|  | Comp Ex. H | Ex. 39 | Ex. 40 |
|---|---|---|---|
| Primer wet pickup (wt %) | >20% | 16.7% | 16.5% |
| RFL wet pickup (wt %) | >20% | none | none |
| Overcoat wet pickup (wt %) | 16% | 10.2% | 25.4% |
| Primer dry pickup (wt %) | >3% | 2.6% | 2.6% |
| RFL dry pickup (wt %) | >3% | none | none |
| Overcoat dry pickup (wt %) | 3% | 1.3% | 3.1% |
| 16 hour rest-Pull @ Room Temp.; 50.8 mm/min (kgf) | 21.9 | 19.2 | 20.9 |
| 17 hour rest-Pull @ Room Temp.; 0.51 m/min (kgf) | 20.2 | 18.3 | — |
| 16 hour rest-Pull @ 150° C.; 50.8 mm/min (kgf) | 4.4 | 3.6 | 3.9 |
| 17 hour rest-Pull @ 150° C.; 0.51 m/min (kgf) | 4.9 | 5.5 | — |
| 16 hour rest-Pull @ Room Temp.; 50.8 mm/min (kgf) | 23.1 | 23.4 | — |
| 16 hour rest-Pull @ 150° C.; 50.8 mm/min (kgf) | 9.3 | 8.9 | — |
| HT Belt Test - 6-rib belt | | | |
| First Edgecord Separation (hrs) | 166 | 151 | 106 |
| Edgecord Failure (hrs) | 245 | 198 | 166 |
| Undercord Cracking Failure (hrs) | 156 | 150 | 128 |
| Belt Temp (° C.) | 130-141 | 135-146 | 137-150 | was degraded after one month of storage of the cord, but with AO, the performance was still excellent after two months of storage.

In another experiment, which will be referred to as Comp. Ex. K, an isocyanate-terminated saturated polybutadiene of similar molecular weight to the unsaturated Krasol NN-22 was used to make an adhesive treatment in the same manner as that of Ex. 38. Comp. Ex. K exhibited rapid failure on the HT test, indicating very poor dynamic adhesion. Thus, it is indicated that unsaturation in the diene polymer may be a preferable. This result was surprising, given that peroxide cured EPDM or EPM should have no trouble crosslinking with polybutadiene even in the absence of unsaturation. However, saturated polybutadiene is known to be more plastic-like than unsaturated polybutadiene, which may lead to brittleness, or coating difficulties, or other issues other than reactivity with the elastomeric belt body. At any rate, it is still believed that an isocyanate-terminated saturated diene polymer may still be useful in the present invention if the polymer is suitably elastomeric and reactive with peroxide curatives from the surrounding elastomer composition.

It should be understood that the present invention provides bonding of rubber to fibers without use of a conventional RFL adhesive and without the use of a conventional overcoat based on chlorinated polymer and one or more curative. The over-

TABLE 6

|  | Ex. 41 | Ex. 42 | Ex. 43 | Ex. 44 | Ex. 45 | Ex. 46 | Ex. 47 | Ex. 48 | Ex. 49 | Ex. 50 | Comp Ex. J |
|---|---|---|---|---|---|---|---|---|---|---|---|
| Greige Cord | S | Z | S | Z | S | Z | S | Z | S | Z | S/Z |
| Primer | MDI | MDI | MDI | MDI | MDI | MDI | MDI | MDI | MDI | MDI | MDI |
| Adhesive | none | none | none | none | none | none | none | none | none | none | RFL Chemlok |
| Overcoat Cement: | | | | | | | | | | | |
| Krasol NN-22 (dry parts by wt) | 65 | 65 | 55 | 55 | 45 | 45 | 35 | 35 | 65 | 65 | 238 |
| Poly Bd 2035 TPU | 35 | 35 | 45 | 45 | 55 | 55 | 65 | 65 | 35 | 35 | |
| Naugard 445 | 0 | 0 | 0 | 0 | 0 | 0 | 0 | 0 | 1.5 | 1.5 | |
| Cement Solids (%) | 10 | 10 | 7.4 | 7.4 | 8 | 8 | 8.7 | 9.9 | 10 | 10 | — |
| Cement Viscosity, cps | 45 | 45 | 44 | 44 | 97 | 97 | 210 | 236 | 45 | 45 | — |
| % pickup (total) | 7.4 | 7.6 | 6.5 | 7.5 | 6.8 | 6.4 | 6.8 | 7.5 | 7 | 7.5 | — |
| Cord Stiffness (kgf) | 0.26 | 0.27 | 0.28 | 0.28 | 0.30 | 0.29 | 0.29 | 0.29 | 0.27 | 0.29 | — |
| Peel Adhesion Testing, Original Pulls, RT, 20"/min | | | | | | | | | | | |
| Area Avg (kgf) | 23.9 | — | 23.9 | — | 23.5 | — | 23.5 | — | 23.4 | — | — |
| failure mode | c100 | — | c100 | — | c100 | — | c100 | — | c100 | — | — |
| HT Belt Test with 6-rib belt | | | | | | | | | | | |
| First Edgecord Separation (hrs) | 108 | | 96 | | 63 | | 71 | | 93 | 160 | 142 |
| Edgecord Failure (hrs) | 152 | | 130 | | 166 | | 138 | | 110 | 150 | 163 |
| Undercord Cracking Failure (hrs) | 108 | | 83 | | 92 | | 82 | | 160 | 160 | 112 |
| RTHS avg belt life (hrs) | 40 | | 44 | | 53 | | 39 | | 54 | | 34 |

TABLE 7

|  | Control | No AO | Control | w/AO |
|---|---|---|---|---|
| HT Belt Test - 6-rib belt | Aged 1 mo. | Aged 1 mo. | Aged 2 mos. | Aged 2 mos. |
| First Edgecord Separation (hrs) | — | — | 240 | 160 |
| Edgecord Failure (hrs) | 122 | 75 | 240 | 150 |
| Undercord Cracking Failure (hrs) | 122 | 60 | 110 | 160 |

In Ex. 49-50, the overcoat includes an anti-oxidant ("AO") to improve the shelf stability of the treated cord. The results of HT belt testing with shelf-aged tensile cord treated with Ex. 41-42 (without AO) and Ex. 49-50 (with AO) are shown in Table 7. It was found that without AO, the HT performance coat of the present invention provides suitable adhesion in a single treatment or layer without curative other than ever-present moisture and/or heat. Alternately a two-layer adhesive system is provided. It is believed that the omission of any curative enhances the shelf stability of the treated cord, as does the addition of an antioxidant. It is believed that the curative present in the surrounding rubber of an article reinforced by the treated cord is sufficient to provide whatever reaction is necessary to effect bonding between overcoat and rubber.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A power transmission belt having an elastomeric body, a pulley-engaging surface, and a tensile member embedded within the elastomeric body, the tensile member comprising fiber and an adhesive treatment at least partially coating said fiber and contacting said elastomeric body, the adhesive treatment comprising as the primary reactive ingredient an isocyanate-terminated diene oligomer or polymer.

2. The belt of claim 1 wherein the adhesive treatment comprises a predominantly polyurea/polyisocyanurate reaction product of the isocyanate-terminated diene oligomer or polymer.

3. The belt of claim 2 wherein the adhesive treatment does not comprise any RFL layer.

4. The belt of claim 2 wherein said adhesive treatment is further a reaction product of a low-molecular-weight isocyanate.

5. The belt of claim 4 wherein the adhesive treatment consists essentially of a primer layer and an overcoat layer; wherein the primer layer at least partially coats said fiber and comprises the reaction product of the low-molecular-weight isocyanate; wherein the overcoat layer contacts said elastomeric body and comprises the reaction product of the isocyanate-terminated diene oligomer or polymer; and wherein both said layers comprise predominantly polyurea and/or polyisocyanurate reaction product.

6. The belt of claim 5 wherein said overcoat layer comprises further a reaction product of low-molecular-weight isocyanate.

7. The belt of claim 5 wherein said overcoat layer further comprises a thermoplastic polyurethane resin, said polyurethane comprising a reaction product of an isocyanate-terminated diene oligomer or polymer, a low-molecular-weight polyisocyanate, and a polyol chain extender.

8. The belt of claim 1 wherein said adhesive treatment comprises further a reaction product of low-molecular-weight isocyanate.

9. The belt of claim 1, wherein the tensile member comprises one or more fibers selected from the group of polyesters, polyamides, polyketones, aramids, carbon, and PBO, and wherein the elastomeric body comprises an ethylene-alpha-olefin elastomer composition, a hydrogenated nitrile elastomer composition, a diene rubber composition, or a polyurethane elastomer composition.

10. The belt of claim 1 wherein said fiber comprises PET or para-aramid, and wherein said elastomeric body comprises peroxide-cured ethylene-alpha-olefin elastomer.

11. The belt of claim 1 in the form of a toothed belt, a multi-v-ribbed belt, or a v-belt.

12. A power transmission belt having an elastomeric body, a pulley-engaging surface, and a tensile member embedded within the elastomeric body; the tensile member having a two-layer adhesive treatment thereon consisting of a primer layer and an overcoat layer; the primer layer comprising a reaction product of a first low-molecular-weight isocyanate compound, and the overcoat layer comprising a reaction product of an isocyanate-terminated polybutadiene with a second low-molecular-weight isocyanate compound in the presence of moisture and/or heat.

13. The belt of claim 12 wherein the first isocyanate compound has the same composition as the second isocyanate compound, and wherein the overcoat layer further comprises an antioxidant.

14. An adhesive treatment for a fibrous reinforcement in a dynamic rubber product comprising as the primary reactive ingredient an isocyanate-terminated diene oligomer or polymer.

15. The adhesive treatment of claim 14 wherein the diene oligomer or polymer is isocyanate-terminated unsaturated polybutadiene.

16. The adhesive treatment of claim 15 further comprising a moisture-reactive low-molecular-weight isocyanate.

17. The adhesive treatment of claim 16 wherein the low-molecular-weight isocyanate is diphenylmethane diisocyanate or a derivative thereof, and wherein the diene oligomer or polymer is isocyanate-terminated polybutadiene of molecular weight from about 2000 to about 15,000.

18. The adhesive treatment of claim 16 further comprising a primer coat and an overcoat, wherein the primer coat consists essentially of the low-molecular-weight isocyanate, and the overcoat comprises the diene oligomer or polymer.

19. The adhesive treatment of claim 18 wherein the overcoat further comprises a low-molecular-weight isocyanate.

* * * * *